(12) United States Patent (10) Patent No.: US 7,877,687 B2
Blinnikka et al. (45) Date of Patent: Jan. 25, 2011

(54) PERSISTENT VISUAL MEDIA PLAYER

(75) Inventors: Tomi J. Blinnikka, Berkeley, CA (US); Steven L. Horowitz, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 828 days.

(21) Appl. No.: 11/893,836

(22) Filed: Aug. 16, 2007

(65) Prior Publication Data

US 2009/0049385 A1 Feb. 19, 2009

(51) Int. Cl.
*G06F 3/048* (2006.01)

(52) U.S. Cl. .................... 715/719; 715/781; 715/791

(58) Field of Classification Search ............... 715/716, 715/719, 727, 733, 738, 760, 764, 765, 781, 715/784, 788, 791, 794, 795, 800, 205, 234
See application file for complete search history.

(56) References Cited

U.S. PATENT DOCUMENTS 6,452,609 B1    9/2002  Katinsky et al.

| | | | |
|---|---|---|---|
| 2003/0069788 A1 | 4/2003 | Han | |
| 2003/0137531 A1* | 7/2003 | Katinsky et al. | 345/716 |
| 2007/0011713 A1* | 1/2007 | Abramson et al. | 725/113 |
| 2007/0136685 A1* | 6/2007 | Bhatla et al. | 715/800 |

FOREIGN PATENT DOCUMENTS

| KR | 2001-0016495 A | 3/2001 |
|---|---|---|
| KR | 2002-0085187 A | 11/2002 |

OTHER PUBLICATIONS

International Search Report and Written Opinion mailed Feb. 6, 2009, for PCT Application No. PCT/US2008/072512 filed Aug. 7, 2008, 11 pages.

* cited by examiner

*Primary Examiner*—Xiomar Bautista

(57) ABSTRACT

An apparatus and method for presenting an embedded visual media player included in a web page in a floating mode is disclosed herein. The status of the embedded visual media player and/or the position of the embedded visual media player relative to the current viewable area of a window are monitored to initiate the floating mode. The floating mode keeps the embedded visual media player within the viewable area while the web page is scrolled.

13 Claims, 7 Drawing Sheets

PERSISTENT VISUAL MEDIA PLAYER

BACKGROUND OF THE INVENTION

The present invention relates to display of visual media information. More particularly, the present invention relates to user influenced display of visual media information.

In recent years, network bandwidth has increased to the point where web pages can include visual media information, such as video, without presentation of such web pages taking an unduly long time. The advantages of visual media information are numerous. For example, visual media information can include moving images and audio information, which is a richer format than textual information. Visual media information is also typically provided to the user with user interactive functionalities. The user controls if and when to start, stop, pause, repeat, etc. his/her viewing of the visual media information. Visual media information, and by extension web pages including such information, may also attract more potential viewers than web pages containing only textual information. Visual media information may also transcend language barriers.

Visual media information included in a web page is typically provided at a fixed area within the web page. If the entirety of the web page requires a larger viewing area than the browser window, then the area with the visual media information can fall outside the browser window depending on the user's interaction with the browser window scroll bar(s). Changing the viewing area of the web page is not uncommon given the fact that most web pages also contain other content (e.g., textual information) at other fixed areas relative to the area for the visual media information.

As the user views the web page and initiates viewing of the visual media information (e.g., clicks on the "play" button icon), the user's interest may turn to other content on the same web page. The user could scroll the web page to the extent that the area associated with the visual media information is partially or fully outside the viewing area of the browser window (such scrolling action is common for long web pages). However, the visual media information continues to "play" regardless of whether the user is currently able to view such content. By the time the user returns to the area containing the visual media information, it may have completed "playing." Alternatively, the user is required to return to the area associated with the visual media information in order to change the presentation state of the visual media information (e.g., to click on the "pause" or "stop" button icon). Thus, the potential of having visual media information included in a web page is not fully realized, because when the visual media information is outside the viewing area of the browser window, it is no different, from the user's point of view, than a web page that does not have visual media information.

One way to maintain the visual media information in a viewable area is to configure the entirety of the web page including the visual media information to fit within the viewable area of the browser window. This may be accomplished either when the web page is created or by the browser at presentation time. Sometimes this approach may not be possible because all of the web page cannot be rendered in the viewable area at once and still be legible.

Another way is to segment the web page into more than one web page and repeat the visual media information in each of the segmented web pages. This approach is likely to involve each segment including a link to the next segment. The downsides to this approach are, among others, decreasing the user experience by requiring more link clicking and/or the lack of continuity in the presentation state of the visual media information among the segmented web pages (e.g., if the visual media information "played" a quarter of the way through in a first segment, then the second segment does not start play of the same visual media information at the start of the second quarter point).

Still another way to maintain the visual media information in a viewable area is to provide the visual media information in a separate browser window, such as a pop-up window. For example, a first browser window may contain a web page with content other than the visual media information, and a second browser window, either automatically or upon user request, opens to provide the visual media information. Each browser window typically functions independently of each other and only one window can be in "front" (or be responsive to user commands) at any given time. Thus, if the user starts to "play" the visual media information in the second window and then goes to the first window to view content in that window, the first window could obscure the second window or the second window may become minimized.

Accordingly, it would be beneficial to have a web page that includes visual media information, in which the visual media information is persistently viewable by the user for the duration of the presentation of the web page. It would be beneficial for the user to have persistent access to interactive functionalities associated with the visual media information for the duration of the presentation of the web page. It would be beneficial to provide a system and method capable of continually presenting the visual media information within the viewable area of a browser window regardless of the scrolling action by the user. It would be beneficial to provide a system and method capable of dynamically modifying a web page that includes visual media information such that the visual media information may be dynamically positioned relative to other content included in the web page in response to user action.

BRIEF SUMMARY OF THE INVENTION

One aspect of the invention relates to a method for modifying a web page. The method includes transmitting instructions operable to identify a visual media element from the web page and to persistently present the visual media element at a fixed location within a viewable area when the web page is simultaneously presented in the viewable area.

Another aspect of the invention relates to an apparatus for dynamically modifying a web page comprising logic operable to present a web page including an embedded visual media element in a viewable area, and monitor a play status of the embedded visual media element included in the web page. The logic is further operable to monitor an out-of-view status of a portion of the embedded visual media element, and present the embedded visual media element at a pre-determined portion of the viewable area in response to at least one of the player status and the out-of-view status.

Still another aspect of the invention relates to a computer program product. The computer program product includes a web page configured to include at least a first content, a visual media item, and a visual media player. The computer program product further includes a first set of instructions capable of using the visual media item and the visual media player from the web page to generate a floating visual media element for the web page. The computer program product further includes computer readable medium encoded with the web page and the first set of instructions, wherein the floating visual media element is operable to persist regardless of a viewing portion of the web page.

Still another aspect of the invention relates to a computer system. The computer system includes a server configured to include a web page having at least a first content, a visual media item, and a visual media player. The server also includes a first set of instructions capable of using the visual media item and the visual media player from the web page to generate a floating visual media element overlaying at least a portion of the web page. The floating visual media element is capable of persisting regardless of a viewing portion of the web page.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined by the claims attached hereto.

BRIEF DESCRIPTION OF THE DRAWINGS

The exemplary embodiments will become more fully understood from the following detailed description, taken in conjunction with the accompanying drawings, wherein the reference numeral denote similar elements, in which.

Figure 11:
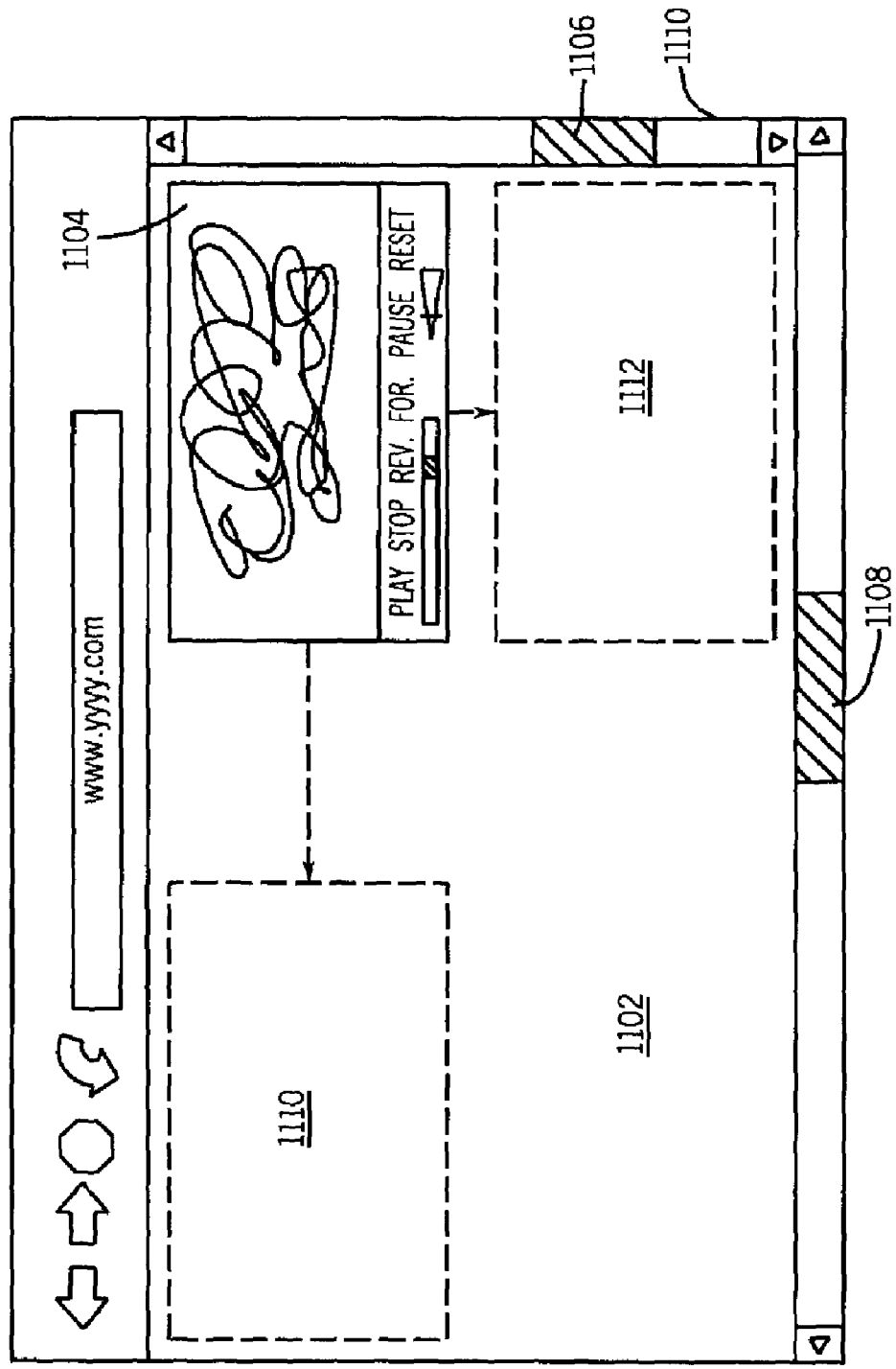

In the drawings, to easily identify the discussion of any particular element or art, the most significant digit or digits in a reference number refer to the figure number in which that element is first introduced (e.g., element 1104 is first introduced and discussed with respect to FIG. 11).

The headings provided herein are for convenience only and do not necessarily affect the scope or meaning of the claimed invention.

DETAILED DESCRIPTION OF THE PREFERRED EMBODIMENTS

Described in detail below is an apparatus and method for providing a persistent and floating visual media element in a web page. Visual media item and accompanying visual media player, collectively the visual media element, included in the web page are floated over the web page in response to the viewer's interaction with the presented web page. When the visual media player is in play mode (either automatically upon presentation of the web page or by the viewer's actuation) and a portion of the visual media element is (or about to fall) out of view, a persistent or floating visual media player mechanism is operable to identify the visual media element and present it in a fixed position within the viewable area. The resulting floating visual media element stays in the viewable area regardless of scrolling of the web page. The float/persistent mode is maintained until a trigger occurs indicating desirability to return to the normal mode. Examples of appropriate triggers include pausing play of the visual media item, completed play of the visual media item, or a new web page request by the viewer. In response, the floating visual media element is returned to the normal page flow of the web page. Accordingly, the viewer is able to view any part of the web page and simultaneously view the visual media item (and have access to the visual media player control panel) without having to wait and/or scroll back and forth within the web page.

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of the embodiments of the invention.

Figure 1:
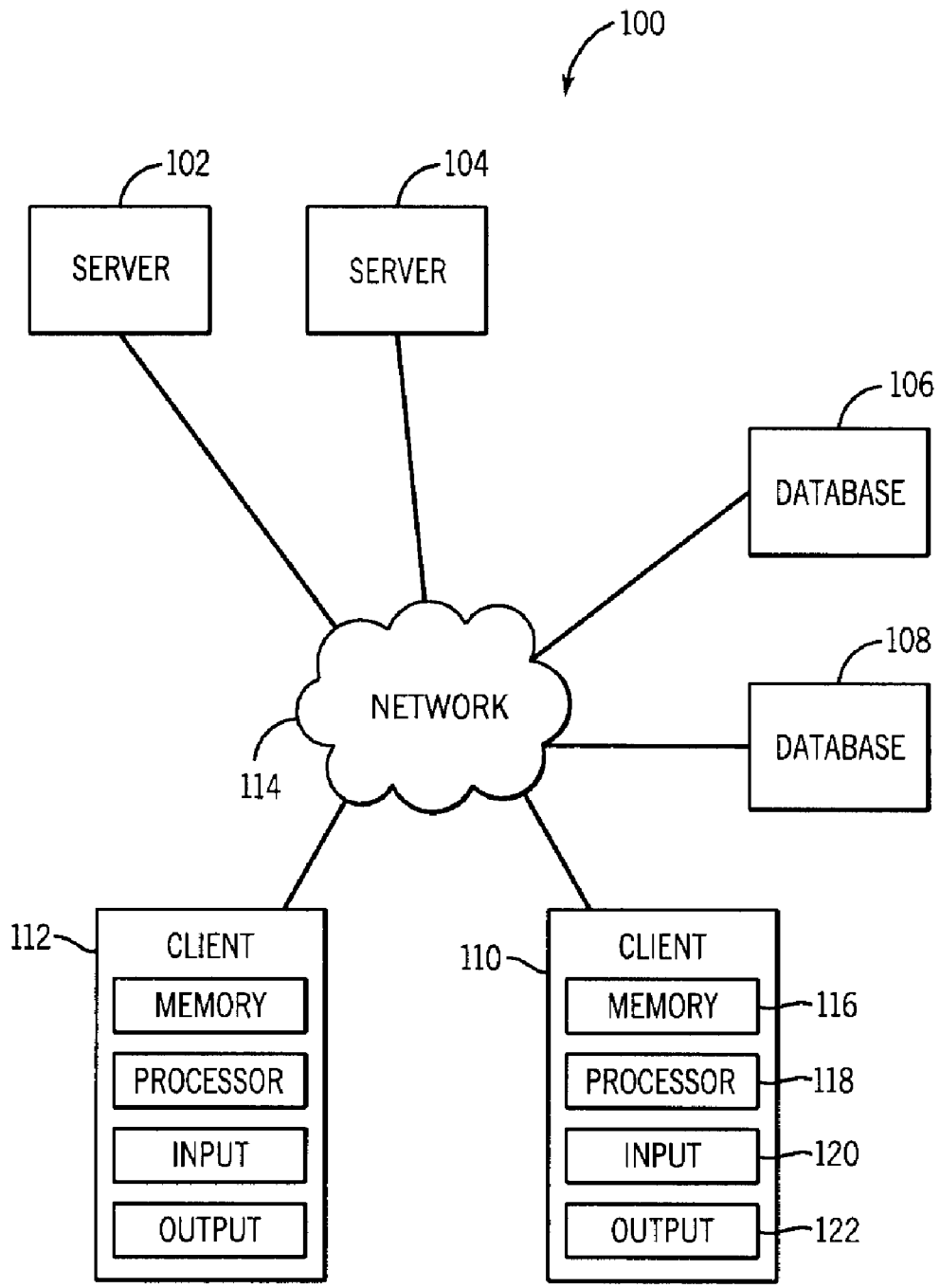
FIG. 1 is a block diagram of one embodiment of a system for providing a persistent or floating visual media element.

Referring to FIG. 1, a block diagram of one embodiment of a system 100 for providing persistently viewable visual media information is shown. The system 100 includes each of a server 102, a server 104, a database 106, a database 108, a client 110, and a client 112 in communication with a network 114.

The servers 102, 104 are host servers operable to provide content, web pages, and/or web-based applications to each of the clients 110 and 112 via the network 114. The databases 106, 108 are operable to store data provided by and/or used by the servers 102, 104 and/or clients 110, 112. The databases 106, 108 may communicate with any of servers 102, 104 or clients 110, 112 via the network 114.

Alternatively, the servers 102, 104 may include the databases 106, 108, processors, switches, routers, interfaces, and/or other components and modules. Each of the servers 102, 104 may comprise one or more servers, or may be combined into a fewer number of servers than shown, depending on computational and/or distributed computing environments. The servers 102, 104 may be located at different geographic locations relative to each other. The databases 106, 108 may also be located at different geographic locations relative to each other and to the servers 102, 104. The databases 106, 108 may be directly connected to the servers 102, 104. It is contemplated that there may be more or less than two servers, more or less than two databases, and/or more or less than two clients comprising the system 100. The system 100 may be comprised of multiple (interconnected) networks such as local area networks and wide area networks.

The client 110 includes a memory 116, a processor 118, an input device 120, and an output device 122. The client 110 may be a general purpose computer (e.g., personal computer). Other computer system configurations, including Internet appliances, hand-held devices, wireless devices, portable devices, wearable computers, cellular or mobile phones, portable digital assistants (PDAs), multi-processor systems, microprocessor-based or programmable consumer electronics, game consoles, set-top boxes, network PCs, mini-computers, and the like may also be implemented as the client 110. The client 110 includes one or more applications, program modules, plug-ins, and/or sub-routines. As an example, the client 110 can include a browser application (e.g., Internet Explorer, Firefox, etc.), Abode Flash Player, media player (e.g., Windows Media Player), and a graphical user interface (GUI) to access web sites, web pages, or web-based applications provided by the servers 102, 104 and data stored in the databases 106, 108. The client 112 is configured similar to the client 110. The clients 110, 112 may be remotely located from each other, the servers 102, 104 and/or the databases 106, 108.

The network 114 is a communications network, such as a local area network (LAN), a wide area network (WAN), or the Internet. When the network 114 is a public network, security features (e.g., VPN/SSL secure transport) may be included to ensure authorized access within the system 100.

Figure 2:
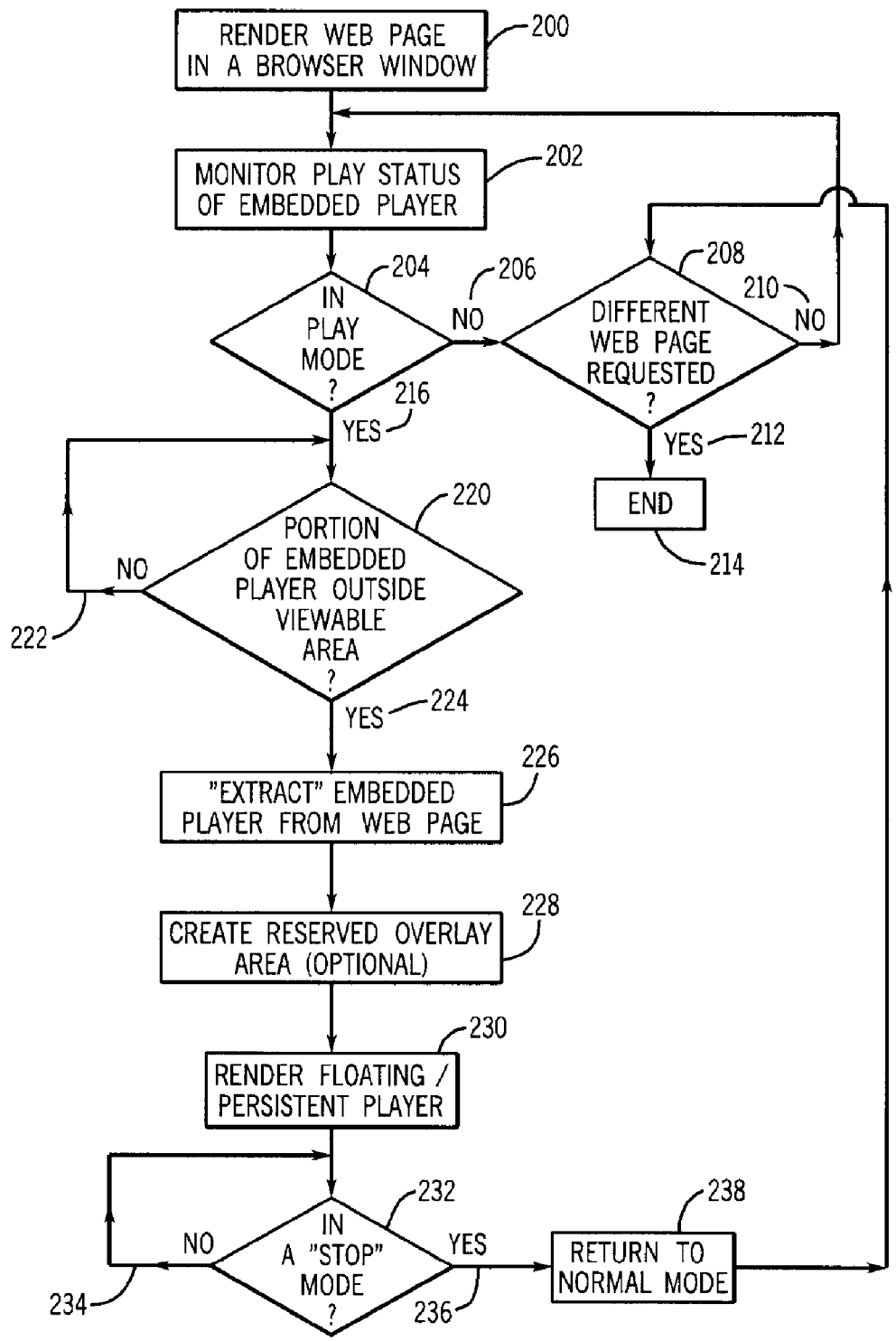
FIG. 2 is a flow diagram of one embodiment of a persistent or floating visual media element mechanism in the system of FIG. 1.

Referring to FIG. 2, a flow diagram illustrating one embodiment for generating a persistent or floating visual media player is illustrated. The flow diagram includes a web page rendering block 200, a play status monitoring block 202, a play mode checking block 204, a different web page request checking block 208, an end block 214, an outside viewable area checking block 220, an embedded player "extraction" block 226, a reserved area creation block 228, a floating player rendering block 230, a "stop" mode checking block 232, and a return to normal mode block 238. The flow diagram of FIG. 2 will be discussed in conjunction with representative web pages illustrated in FIGS. 3-8.

At the block 200, a browser application at a client, such as the client 110, receives data associated with a web page from a server, such as the server 102, and renders the web page in a browser window. The web page includes visual media item and a visual media player. Visual media item comprises, but is not limited to, video, animation, slide show, graphics, video conference feed, webcam feed, video phone feed, or audio player. The visual media player may be any type of player capable of running the visual media item, and which provides a control panel for user interactive capabilities such as play, stop, pause, forward, reverse, fast forward, fast reverse, etc. Examples of visual media players include Windows Media Player and Real Media Player. The browser application also receives data and/or instructions (such as computer readable code or instructions) to provide the persistent visual media player functionality. Such data and/or instructions can be embedded within the requested web page, or it can be a stand-alone module or plug-in. In one embodiment the persistent visual media player functionality is referred to as the persistent or floating visual media player mechanism.

Figure 3:
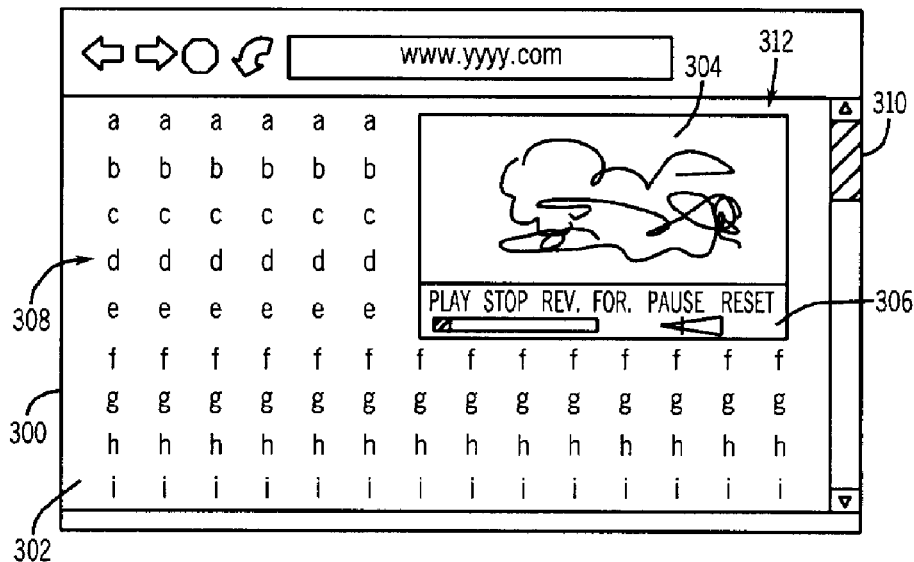
FIGS. 3-8 illustrate representative web pages displayed in accordance with the persistent or floating visual media element mechanism of FIG. 2.

Referring to FIG. 3, a representative browser window 300 displaying a web page 302 is illustrated. The browser window 300 may be a window provided at the client 110. The browser window 300 includes a scroll bar 310. The scroll bar 310 can be moved up or down to view any portion of the web page 302. The web page 302 includes at least one visual media item 304, a visual media player 306, and textual information 308 (or other textual and/or graphical information). The visual media item 304 and the visual media player 306 comprise an element within the web page 302, referred to as a visual media element 312. The visual media player 306 is "packaged" together with the visual media item 304 in order to provide viewing control to the person viewing the visual media item 304. The visual media player 306 in such configuration is also referred to as an embedded player.

In FIG. 3, the top portion of the web page 302 is displayed, and all parts of the visual media element 312 are within a viewable area of the browser window 300. Although the web page 302 is illustrated as a single column page, it is contemplated that the web page 302 can comprise two or more columns, or other page layouts.

After the web page 302 has been rendered, the play status of the visual media element 312 is monitored at the block 202. The additional data and/or instructions received from the server are in communication with or "hooks" into the visual media player 306 to obtain the play status maintained by an Application Programming Interface (API). Next at the block 204 and a branch 206, if the visual media player 306 is not in a play (or running) state, then a check is performed to determine whether a different web page has been requested (block 208). If a different web page has been requested ("yes" branch 212), then a persistent visual media player is not needed for the web page 302 (block 214). On the other hand, if a different web page has not been requested ("no" branch 210), then monitoring of the play status continues at the block 202.

If the visual media player 306 is in a play state ("yes" branch 216), then the position of the visual media player 306 relative to the viewable area of the browser window 300 is checked in the block 220. The visual media player 306 can be in a play state because the viewer of the web page 302 clicked on a "play" button provided by the visual media player 306 or the web page 302 may be pre-configured to start playing or running the visual media item 304 upon rendering of the web page 302 in the browser window 300.

In the block 220, a check is performed to see if any portion of the visual media element 312 falls (or is about to fall) outside the viewable area of the browser window 300. The visual media element 312 can provide its position information to the mechanism (or browser application), or the mechanism (or browser application) can be configured to obtain the position information from the visual media element 312 or web page 302. Alternatively, the persistent visual media player functionality can be configured to check the direction of the page scroll and anticipate whether a portion of the visual media element 312 is about to fall outside the viewable area of the browser window 300. As another alternative, the persistent visual media player functionality can be configured to check for a particular portion of the visual media element 312 falling outside the viewable area of the browser window 300. For example, the block 220 may check whether the top edge of the visual media element 312 has or is about to move outside the viewing area of the browser window 300.

If all portions of the visual media element 312 are within the browser window 300 ("no" branch 222), then checking for a portion of the visual media element 312 outside the viewable area continues at the block 220. On the other hand, if a portion of the visual media element 312 has moved outside the viewing area (or moving outside is eminent) ("yes" branch 224), then floating the visual media element 312 out of its normal position within the web page 302 begins at the block 226.

Figure 4:
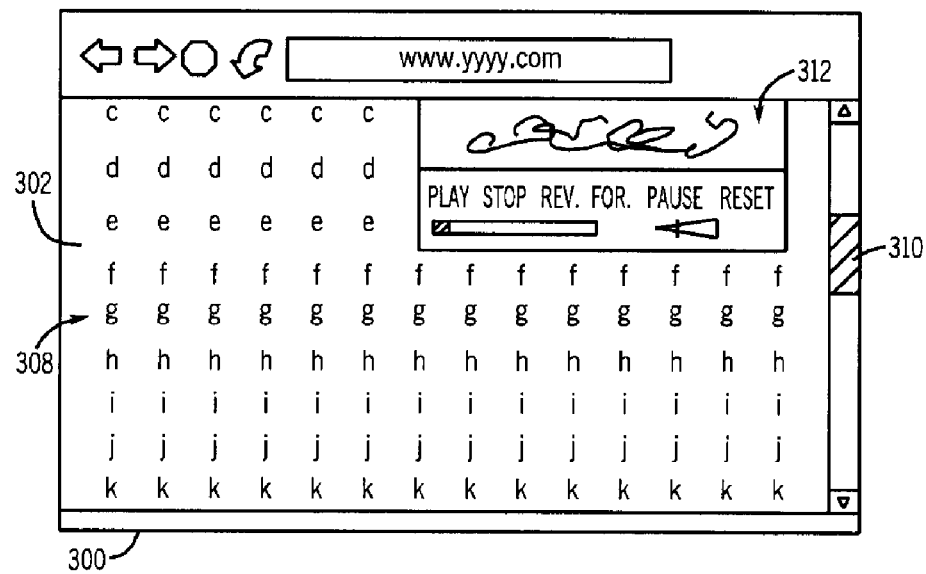

For the web page 302 illustrated in FIG. 4, the visual media element 312 is not in play mode (e.g., play mode has completed or play mode has not been initiated) and the scroll bar 310 is at a lower position compared to the position illustrated in FIG. 3. The viewer is scrolling down to view a lower portion of the web page 302. As the web page 302 is scrolled, the upper portion of the web page 302, including the visual media element 312, starts to fall outside the viewable area of the browser window 300. When the viewer does not express interest in the visual media element 312 (e.g., viewer has not initiated play of the visual media element 312) or the visual media element 312 is inactive (e.g., not in play mode), then the visual media element 312 is treated the same as the rest of the content comprising the web page 302, including scrolling out of the viewable area based on the position of the scroll bar 310.

When the status of the visual media player 306 and the position of the visual media element 312 relative to the viewable area of the browser window 300 indicate that the visual media player 306 is playing and a portion of the visual media element 312 has scrolled out of view (or is about to scroll out of view), the persistent or floating visual media player mechanism modifies the web page 302 so that the visual media element 312 is taken out of the normal page flow and is dynamically overlaid on the web page 302 for continual viewing regardless of the original portion of the web page 302 within the viewable area of the browser window 300.

At the block 226, the visual media element 312 is extracted from the web page 302. At the block 230, a new container element (e.g., a HTML grouping element) is created at a pre-determined location within the viewable area, and the extracted visual media element 312 is displayed in the newly created container element. The pre-determined location comprises a fixed portion of the viewable area, such as the top right corner, of a size and shape appropriate to match the extracted visual media element 312. In providing the extracted visual media element 312 at the new location, there is no interruption of the existing play status of the visual media element 312. For example, if the visual media element 312 was playing for five seconds before it had or was about to scroll out of view, then the extracted visual media element 312 displayed in accordance with the block 230 would not restart play from the beginning of the visual media item 304. It would continue playing as it had while in the normal page flow.

In an alternative embodiment, the blocks 226 and 230 comprise modifying the layout behavior of the visual media element 312 without creating new elements. At the blocks 226 and 230, the positioning of the visual media element 312 (or its parent container element if it exists) is no longer calculated in relation to the other elements (or content) of the web page 302. As such, content other than the visual media element 312 continues to reposition as the page scrolls but the visual media element 312 stays fixed in the viewable area, typically at the last location before it started to scroll out of view.

For both embodiments, the start of the manipulation of the visual media element 312 (e.g., block 226) is generally referred to as identification of the visual media element 312 in preparation of persistent presentation. The style associated with the visual media element 312 is changed from existing position coordinates to new fixed position coordinates or programmatically kept at the desired coordinates based on the current scroll position to maintain the visual media element 312 at the new pre-determined fixed area in the browser window 300.

The repositioned visual media element 312 is referred to as a persistent and/or floating visual media player (or element). Content of the web page 302 that would normally exist where the persistent visual media player is newly positioned is obscured by the persistent visual media player. (Another way to conceptualize the element 312 is that it is an opaque layer over the web page 302 such that content underneath is not visible.) The persistent state of the player and hiding the web page 302 content underlying the persistent player at any given time are maintained as the viewer scrolls up or down and/or otherwise interacts with the web page 302. All of the control panel functionality of the visual media player 306 also continues to be provided in the persistent visual media player.

The block 228 is optional depending on the original configuration of the web page 302. If a parent container element already exists in the web page 302 for the visual media element 312, then such parent container element is untouched to prevent changing the layout of the rest of the web page 302 when the visual media element 312 is extracted for re-creation or its layout position is changed relative to the rest of the web page 302. The parent container element serves as a placeholder for the missing visual media element 312 so that the layout of the rest of the web page 302 is maintained. If a parent container element does not exist in the web page 302 for the visual media element 312, then a placeholder container element is created to reserve the space previously occupied by the visual media element 312. The block 228 may occur simultaneous with the block 226.

Figure 5:
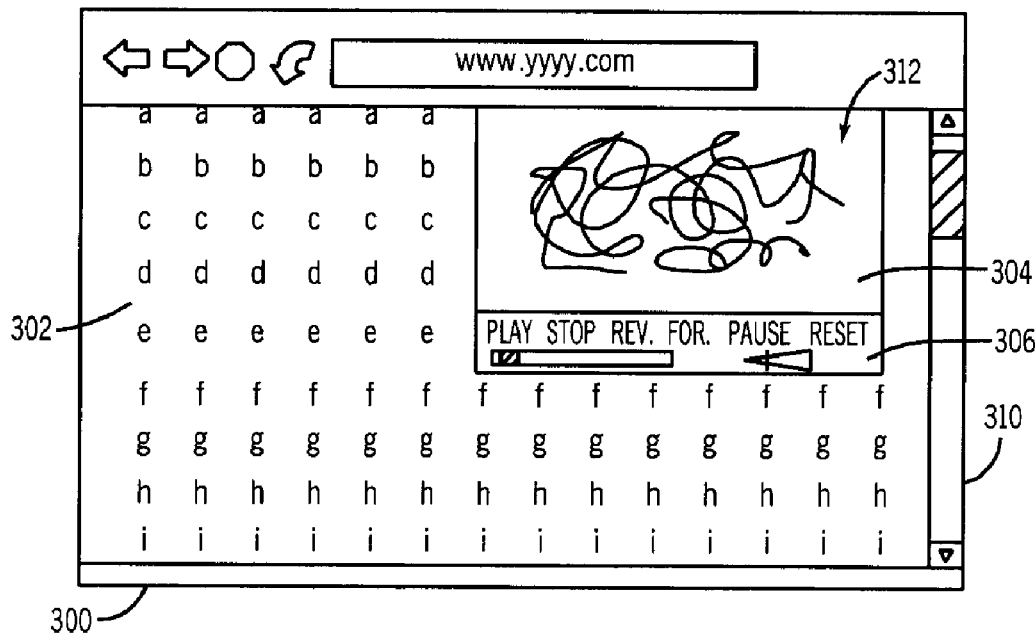
Figure 6:
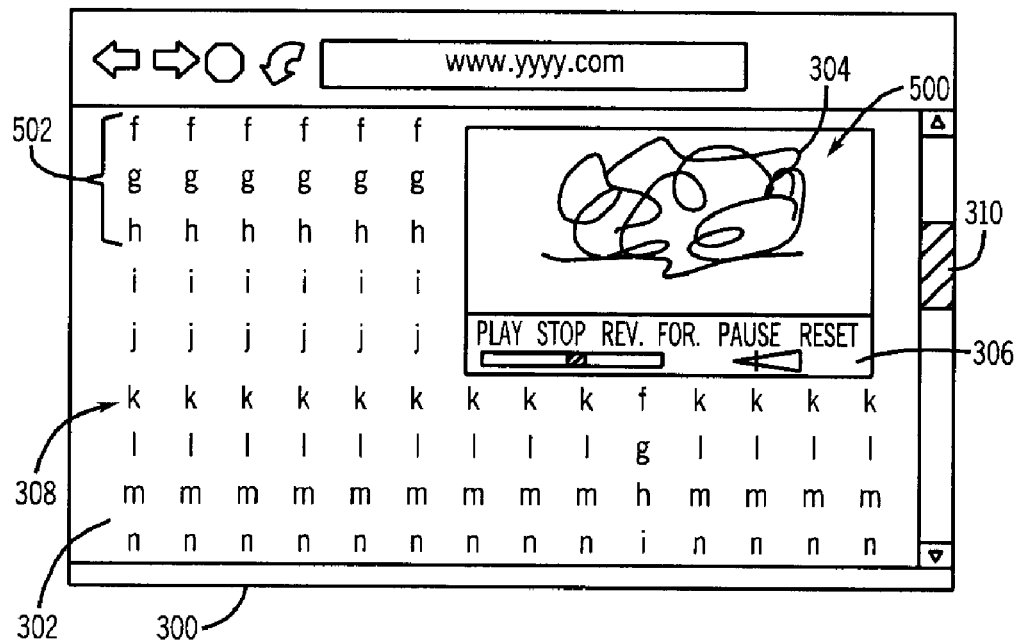

Referring to FIG. 5, the web page 302 is illustrated with the top edge of the visual media element 312 about to move out of view. The position of the scroll bar 310 is at a lower position relative to the position of the scroll bar 310 in FIG. 3. Although not shown, the visual media element 312 in FIG. 5 is in a play state. Thus, both conditions for triggering the floating visual media player have occurred. In FIG. 6 a persistent or floating visual media element 500 is shown for the web page 302. The persistent element 500 is the visual media element 312 pulled from the normal page flow of the web page 302 and repositioned to continually "float" at a pre-determined position within the viewable area of the browser window 300 over any existing content. In FIG. 6, the pre-determined position is the upper right corner of the browser window 300. The viewer has scrolled down further than in FIG. 5 (the position of scroll bar 310 is at a lower position relative to the position shown in FIG. 5) but the persistent element 500 stays in view. The textual information 308 continues to be displayed, although part of the text lines "f," "g," "h," "i," and "j" 502 are hidden by the persistent element 500.

Figure 7:
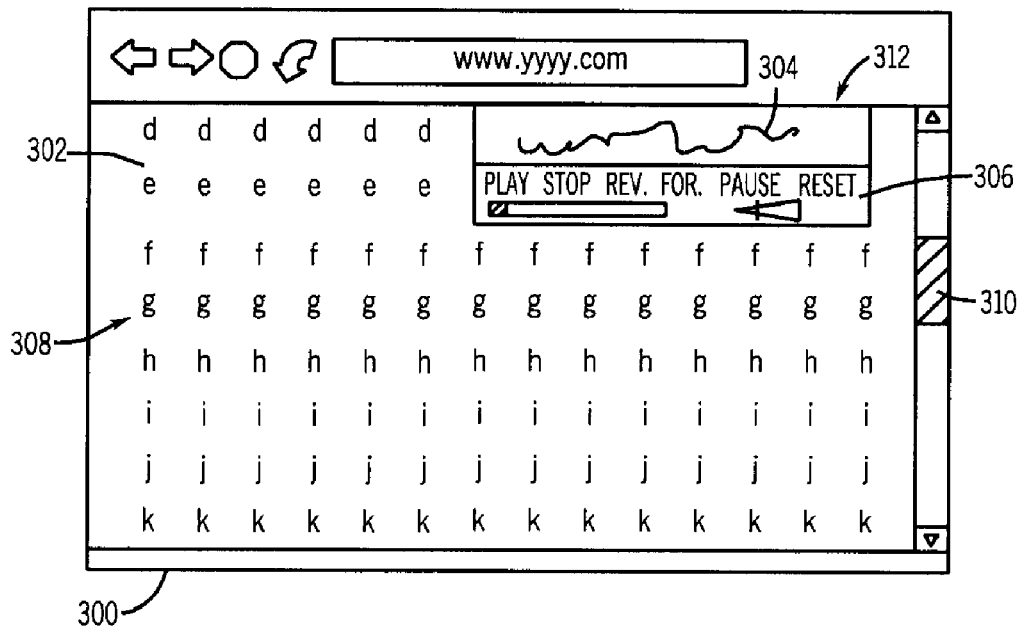
Figure 8:
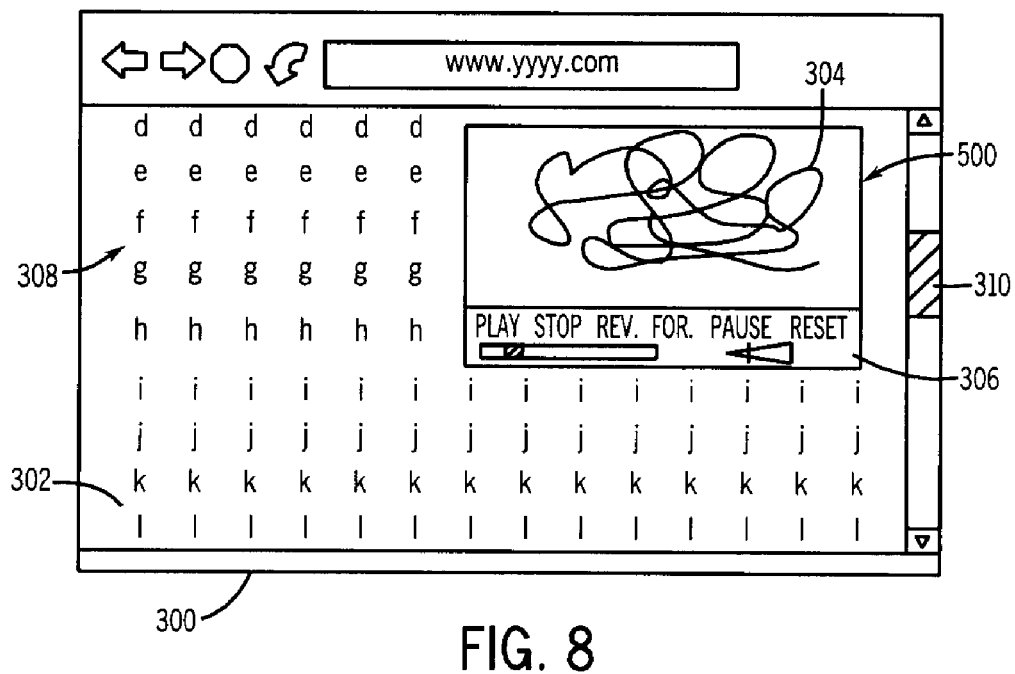

Even if the visual media element 312 is already partially outside the viewable area of the browser window 300, the persistent or floating visual media player mechanism is operable. The web page can switch to float/persistent mode even if the viewer initiates play of the embedded player after reading the web page for a while. For example, if the viewer has scrolled the web page such that a portion of the embedded player has already scrolled out of view and then the viewer selects the play button on the embedded player, then the float/persistent mode occurs at that point in time. Referring to FIG. 7, the web page 302 is illustrated with the visual media element 312 partially outside the viewable area of the browser window 300 and not in a play state. The position of the scroll bar 310 is at a lower position than shown in FIG. 5. If the viewer then initiates play of the visual media item 304, then both conditions for triggering the floating visual media player are satisfied. Accordingly, in FIG. 8 the visual media element 312 is illustrated in the float mode with the floating visual media element 500 for the web page 302. Similar to FIG. 6, the persistent element 500 is the visual media element 312 pulled from the normal page flow of the web page 302 and repositioned to continually "float" at a pre-determined position within the viewable area of the browser window 300 over any existing content. The textual information 308 continues to be displayed, although part of text lines "f," "g," and "h" are hidden by the persistent element 500.

It is understood that the pre-determined position of the persistent visual media player is not limited to the upper right corner. It can be set at any area within the viewable area of the browser window 300. In another embodiment, rendering the floating player in the block 230 can include resizing the visual media element 312. Resizing may be preferable for small browser windows, such as those in mobile devices, assuming that resizing does not make viewing difficult due to shrinkage, stretching, or resolution issues.

In still another embodiment, rendering the floating player in the block 230 includes displaying a minimized floating player (e.g., displaying just a portion of the player such as the control panel 306) or a floating icon representative of the player. Since the visual media item 304 is unlikely to be viewable in such minimized/icon state, the visual media item 304 is also placed in a pause mode in the block 230. An additional block would exist between blocks 230 and 232 to facilitate viewing the visual media item 304 while in float mode. The viewer indicates a desire to view and/or continue playing the visual media item 304 (e.g., clicks on the play button or an expand button, or hovers the mouse pointer over the minimized/icon floating player). In response the minimized/icon floating player is replaced by the full size floating player (e.g., floating visual media element 500) and play of the visual media item 304 resumes.

Once the persistent visual media player is presented in the browser window 300, the viewer is free to scroll the web page 302 up or down, manipulate the control panel of the persistent visual media player, and/or otherwise interact with the web page 302 without losing the persistent visual media player. In this manner the viewer can view any part of the web page 302 and have full access to the visual media item 304 at the same time. Such functionality is valuable for long web pages such as search result pages, blog posts, or user profile pages (e.g., MySpace), or for mobile devices which tend to have small screens and correspondingly small browser windows.

At the block 232, a "stop" status of the persistent visual media player or the web page 302 is checked to determine whether to continue floating the player or to return the player to the normal web page position. The "stop" status can comprise any of one or more of pre-determined status associated with the persistent visual media player or the web page 302. Examples of one or more pre-determined status includes, but is not limited to, the viewer clicking on a stop button included in the player control panel, the viewer clicking on a pause button included in the player control panel, the viewer clicking on a reset button included in the player control panel, the viewer clicking on a refresh icon of the browser window 300 (to refresh rendering of the web page 302), the viewer clicking on a close icon provided with the floating visual media player, the viewer closing the web page 302, the viewer requesting a different web page, the visual media item 304 having completed playing, or other possible indications.

If an appropriate "stop" status is detected ("yes" branch 236), then the persistent visual media player is returned to normal mode in the block 238. The extracted visual media element 312 is returned to the normal page flow to move with the rest of the web page 302. A snapback animation (or other visual effect) can accompany the return of the extracted visual media element 312 to the normal page flow. Next, if a different web page has not been requested (block 208), then monitoring the play status of the visual media player 306 continues (block 202). On the other hand, if no appropriate "stop" status is detected ("no" branch 234), then monitoring for a "stop" status continues.

Even though the persistent visual media player floats over the web page, the persistent visual media player is tied to the web page (it is not a separate window, such as a pop up window). If, for example, the web page is closed or refreshed, then the persistent visual media player disappears. The persistent visual media player represents enhanced access to existing content provided in a web page, by identifying visual media item from the web page in response to specific viewer activity and then floating the extracted visual media item for simultaneous viewing with any part of the web page.

In alternative embodiments of the flow diagram of FIG. 2, the block 220 can be configured to trigger identification of the embedded player based on a specific portion of the embedded player being out of view (or about to go out of view). For example, the specific portion of the embedded player can be the top edge, bottom edge, left edge, right edge, or any portion of the embedded player.

Figure 9:
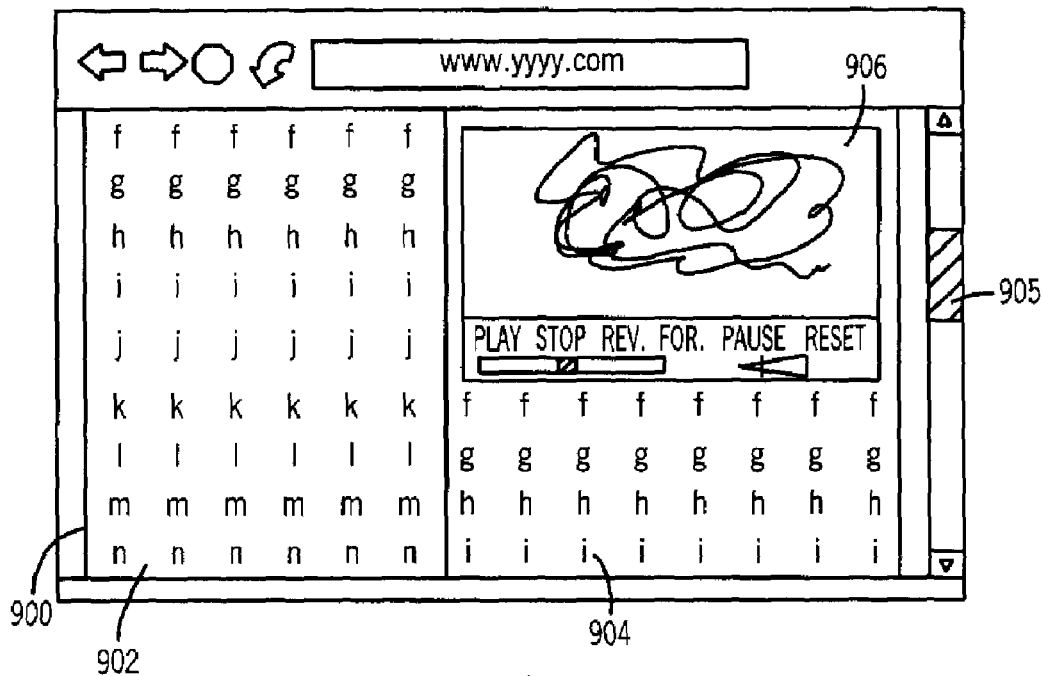
FIGS. 9-11 illustrate representative web pages displayed in accordance with alternative embodiments of the persistent or floating visual media element mechanism of FIG. 2.
Figure 10:
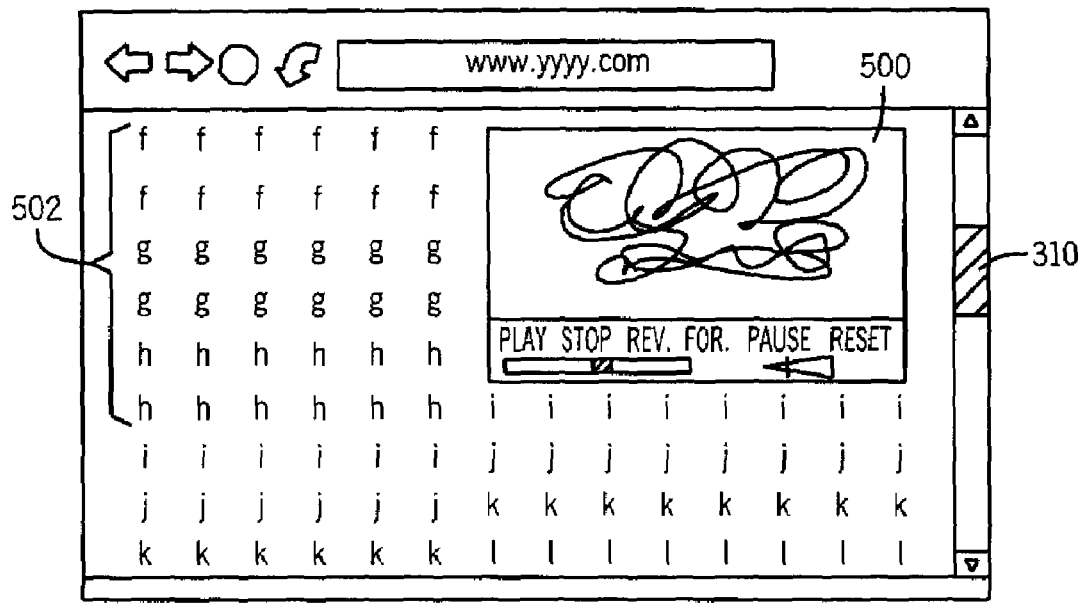

Additional block(s) can exist between blocks 230 and 232 to address particular treatment of the content normally underlying the floating player. Rather than concealing content located in the same area as the floating player, the web page can be further modified to display such content while the web page is in the float/persistent mode. As an example, the content that would otherwise be hidden under the floating player can be "pushed down" to display below the floating player. FIG. 9 illustrates a web page 900 including a left column 902 and a right column 904. The left column 902 contains similar content as in the web page 302 while the right column 904 includes additional content such as advertisement, text, and/or graphics. A scroll bar 905 is in the same position as shown in FIG. 6. When in the float mode, the content in the left column 902 scrolls with the web page 900, but the content of the right column 904 that would otherwise be hidden by a floating visual media element 906 is fully displayed in an area below the floating visual media element 906. As another example, the content that would otherwise be hidden under the floating player can be "wrapped around" the floating player such that no content is obscured. In FIG. 10, the scroll bar 310 is in the same position as shown in FIG. 6. However, the normal page flow of the content 502 (as shown in FIG. 6) is modified to "wrap around" or be repositioned to only fill the viewable area not occupied by the floating player 500. Due to the normal page flow of the textual information 308, the content that normally follows the content 502 may also require repositioning.

Additional block(s) can exist between blocks 230 and 234 to permit user control of the position of the floating player within the browser window. FIGS. 6, 8, 9, and 10 illustrate the floating player located at the upper right corner of the viewable area of the browser window. Once the floating player has been rendered at the block 230, the viewer may be able to reposition the floating player anywhere in the viewable area. Such repositioning capability is advantageous, for example, in the embodiment where content normally underlying the floating player is hidden by the floating player and the viewer wishes to view the underlying content without scrolling.

In another embodiment, the trigger to initiate the persistent/float mode may be a single trigger such as the embedded player being in play state (block 204) or a portion of the embedded player being outside (or about to be outside) the viewable area (block 220). In still another embodiment, no trigger may be required. Instead the mechanism is operable to automatically initiate persistent/float mode a set time (e.g., 3 seconds) after the web page has been presented to the viewer. Other than the variations in triggers, the remaining functionalities of the mechanism are as discussed above.

Moreover, although FIGS. 6, 8, 9, and 10 illustrate a browser window with a vertical scroll bar, the persistent or floating visual media player mechanism is applicable for wide web pages (e.g., requiring a horizontal scroll bar) and/or long web pages (e.g., requiring a vertical scroll bar). Referring to FIG. 11, a web page 1102 is displayed in a browser window 1100. The web page 1102 is sufficiently large that both a vertical scroll bar 1106 and a horizontal scroll bar 1108 are needed to view the entire page. In one embodiment, the persistent or floating visual media player mechanism is configured to position a floating player 1104 within the browser window 1100, such as the upper right corner, an upper left corner 1110, or a lower right corner 1112. In another embodiment, the persistent or floating visual media player mechanism is configured to permit the viewer to change the predetermined position of the floating player 1104, for example, from the upper right corner default position to the upper left corner 1110, the lower right corner 1112, or anywhere in the browser window 1100.

In this manner, an apparatus and method for providing a persistent and floating visual media element in a web page is disclosed herein. Web page viewing is improved by providing two viewing modes, a float/persistent mode and a normal mode. The viewing mode is tailored to the viewer's actual interaction with the web page. The trigger(s) to initiate the float/persistent mode and to return to the normal mode are flexible and can be selected to fit the browser application, web page, and/or device rendering the web page. In one embodiment, monitoring both the status of the embedded visual media player and the position of the embedded visual media player within the viewable area of the browser window permits the viewer experience in reading the web page to be optimized.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

The software modules discussed herein may include script, batch or other executable files, or combinations and/or portions of such files. The software modules may include a computer program or subroutines thereof encoded on computer-readable media.

The invention can be implemented in any suitable form including hardware, software, firmware or any combination thereof. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

One or more sequences of one or more instructions, such instructions generally referred to as "computer program code" or "computer executable code" (which may be grouped into the form of computer programs or other groupings), are executable by the server 102 or the client 110 to perform features or functions of embodiments of the present invention. The code may directly cause a processor to perform specified operations, be compiled to do so, and/or be combined with other software, hardware, and/or firmware elements to do so. The terms "computer program product," "computer-readable medium," and the like may be used generally to refer to media included in, for example, the server 102 or the client 110. These and other forms of computer-readable media may be involved in storing computer program code or logic for use by the server 102 or the client 110 to perform specified operations.

Moreover, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. An apparatus for dynamically modifying a web page comprising logic operable to:

present a web page including an embedded visual media element in a viewable area;

monitor a play status of the embedded visual media element included in the web page;

monitor an out-of-view status of a portion of the embedded visual media element; and present the embedded visual media element at a pre-determined portion of the viewable area in response to at least one of the play status and the out-of-view status.

2. The apparatus of claim 1, wherein a portion of the web page underlying the pre-determined portion is hidden.

3. The apparatus of claim 1, further comprising logic operable to modify the position of content included in the web page to wrap around the pre-determined portion.

4. The apparatus of claim 1, further comprising logic operable to modify the position of content included in the web page to be presented below the pre-determined portion.

5. The apparatus of claim 1, further comprising logic operable to:

monitor an indication to stop presenting the embedded visual media element in the pre-determined portion; and return the embedded visual media element to the web page in response to the indication.

6. The apparatus of claim 1, further comprising logic operable to:

extract the embedded visual media element from the web page; and create a container element at the pre-determined portion of the viewable area prior to presentation of the embedded visual media element.

7. The apparatus of claim 1, wherein presentation of the embedded visual media element at the pre-determined portion of the viewable area comprises preventing the embedded visual media element from repositioning with the rest of the web page in response to a scroll action of the web page.

8. The apparatus of claim 1, wherein the visual media element comprises video, animation, slide show, graphics, video conference feed, webcam feed, video phone feed, or an audio player.

9. The apparatus of claim 1, further comprising logic operable to change the pre-determined portion of the viewable area.

10. The apparatus of claim 1, further comprising logic operable to resize the extracted visual media element for presentation in the pre-determined portion.

11. The apparatus of claim 1, further comprising logic operable to change the play status to a pause status for presentation of the embedded visual media element at the pre-determined portion of the viewable area.

12. The apparatus of claim 11, wherein presentation of the embedded visual media element at the pre-determined portion comprises minimizing the extracted visual media element for presentation in the pre-determined portion of the viewable area.

13. The apparatus of claim 11, wherein presentation of the embedded visual media element at the pre-determined portion comprises presenting an icon representative of the embedded visual media element at the pre-determined portion of the viewable area.

* * * * *